(12) United States Patent
Kisenyi

(10) Patent No.: US 6,230,485 B1
(45) Date of Patent: May 15, 2001

(54) MOTOR VEHICLE EXHAUST CATALYST REGENERATION

(75) Inventor: Jonathan Muwanga Kisenyi, Herts (GB)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 09/446,060
(22) PCT Filed: May 14, 1998
(86) PCT No.: PCT/GB98/01370
§ 371 Date: Dec. 16, 1999
§ 102(e) Date: Dec. 16, 1999
(87) PCT Pub. No.: WO99/01653
PCT Pub. Date: Jan. 14, 1999

(30) Foreign Application Priority Data

Jun. 30, 1997 (GB) .................................................. 9713706

(51) Int. Cl.[7] ........................................................ F01N 3/00
(52) U.S. Cl. .................................................. 60/285; 60/295
(58) Field of Search ................................... 60/274, 277, 285, 60/295

(56) References Cited

U.S. PATENT DOCUMENTS

| | | | |
|---|---|---|---|
| 5,473,887 | * 12/1995 | Takeshima et al. | 60/285 |
| 5,595,060 | * 1/1997 | Togai et al. | 60/277 |
| 5,778,666 | * 7/1998 | Cullen et al. | 60/285 |
| 5,782,087 | * 7/1998 | Kinugasa et al. | 60/285 |
| 5,791,139 | * 8/1998 | Atago et al. | 60/285 |
| 5,974,793 | * 11/1999 | Kinugasa et al. | 60/285 |
| 6,125,628 | * 10/2000 | Itami et al. | 60/285 |

* cited by examiner

Primary Examiner—Thomas Denion
Assistant Examiner—Diem Tran
(74) Attorney, Agent, or Firm—Jerome B. Drouillard

(57) ABSTRACT

An exhaust gas purification system for an internal combustion engine includes an engine management control system which controls engine air/fuel ratio alternatively at super-stoichiometric level and a sub-stoichiometric level in a three-way catalyst. The engine management system uses a timer and a memory to measure and store cumulative time values including first time over which the engine is operated at the super-stoichiometric level and a second time during which the engine is operated at a sub-stoichiometric level. The alternation between levels is such that the first cumulative time is greater than the second cumulative time with the second cumulative time being sufficient to regenerate at least partially the efficiency of the three-way catalyst activity.

4 Claims, 8 Drawing Sheets

Fig. 3 Sheet 1

To Fig. 3 Sheet 2

Fig. 3 Sheet 2

MOTOR VEHICLE EXHAUST CATALYST REGENERATION

BACKGROUND OF THE INVENTION

The present invention relates to an apparatus and method for regenerating an aged motor vehicle exhaust catalytic converter.

Three-way catalysts in an exhaust gas purification system degrade with use, owing to oxidation of the noble metals used in such catalysts, normally Pt, Pd and Rh. This oxidation is a result of the normally lean burn engine operating conditions, typically an air/fuel super-stoichiometric level of lambda $\lambda=1.01$, which is set in order to achieve improved fuel economy, and a suitable balance between the purification efficiencies of the three catalysts for unburned hydrocarbons, CO and NOx.

Patent document EP 0 490 612 A1 discloses an engine control system in which timers measure lean and rich running periods which alternate on a time scale of seconds or less.

It has been proposed in patent document U.S. Pat. No. 4,729,220 that the rate of oxidation of Rh in a three-way catalyst system may be reduced by reducing the air/fuel ratio to stoichiometric $\lambda=1$ or below, when the catalyst temperature exceeds 750° C., depending also on engine load operating conditions. However, with this system it is necessary to use continuously temperature sensors and engine load sensors in order to set the air/fuel mixture, which is relatively complicated and expensive. Furthermore, in some conditions, for example in a hot ambient environment, or heavy engine load, the catalyst may be continuously above the 750° C. limit meaning that the air/fuel mixture is set at stoichiometric or below for an extended period of time, which may result in non-optimal fuel consumption or catalyst efficiency.

SUMMARY OF THE INVENTION

It is an object of the present invention to provide a more convenient and economical apparatus and method of improving the performance of a three-way catalytic converter as the converter ages.

Accordingly, the invention provides an exhaust gas purification system for an internal combustion engine, comprising:

an internal combustion engine having an exhaust conduit;
an engine management system with control means capable of controlling the engine air/fuel ratio alternately at a super-stoichiometric level and at a sub-stoichiometric level;
a three-way catalyst in-line with the exhaust conduit and comprising noble metals selected from the platinum group and rhodium, the catalyst exhibiting a three-way oxidizing activity on the exhaust gases, and the efficiency of the three-way activity degrading over time when the engine is operated at a super-stoichiometric level;
characterized in that the engine management system comprises timer and memory means to measure and store more than one cumulative time, including a first cumulative time over which the control means controls the engine at the super-stoichiometric level and during which the efficiency of the three-way activity degrades, and also a second cumulative time over which the control means controls the engine at a sub-stoichiometric level, the alternation between levels being such that the first cumulative time is greater than the second cumulative time, and the second cumulative time is between about one and ten hours to regenerate at least partially the efficiency of the three-way activity.

The engine air/fuel mixture is therefore cycled between alternate super- and sub-stoichiometric levels at predetermined times according to the cumulative engine operating times.

The engine may therefore be operated for a time, particularly an extended time at a super-stoichiometric level for improved fuel economy and for balanced catalyst performance, during which time the catalyst performance will naturally degrade through oxidation of the noble metals. The extended period may be at least one hour, but is more likely to be considerably more, for example, typically 100 to 300 hours of normal ageing conditions which would equate roughly to 5,000 km to 30,000 km of motoring. The extended period could be as much as about 1000 hours of normal ageing conditions, although this would result in a typical three-way catalyst degrading to about 50% efficiency, and it is preferred to take action to recover partially the catalyst performance before this level of degraded efficiency is reached.

Surprisingly, it has then been found that if the air/fuel mixture is changed to a sub-stoichiometric level, the performance of a typical three-way catalyst can gradually be partially recovered. This recovery takes place over a period of between about one and ten hours of engine operating time. The recovery process consists of the oxygen-getting species in the exhaust gas, such as unburned hydrocarbons, carbon monoxide, scavenging oxygen from the partially oxidized noble metals.

The amount of recovery depends on a number of factors, but in the case where the performance has degraded to about 50% to 75% of initial performance, the recovery will be to about 80% to 90% of the initial performance. It is not possible to recover fully the catalyst performance owing to loss of active surface area from thermal fusing of the porous catalyst structure.

During the recovery stage, the fuel economy and catalyst performance will be slightly degraded from what could be achieved at the normal super-stoichiometric air/fuel levels, but this loss is outweighed by the catalyst performance improvement upon a return to these normal air/fuel levels, as long as the time spent on average at a sub-stoichiometric level is no more than $1/10$ that spent at a super-stoichiometric level. Although many different regeneration alternation strategies may be envisaged, it is therefore preferable if the alternation between levels is such that the first cumulative time is at least ten times the second cumulative time.

In one embodiment of the invention, the timer means is reset following a return to an air/fuel ratio at a super-stoichiometric level. The alternation strategy for subsequent cycles is then the same as for the first cycle. However, it would be possible for the first and second predetermined times, and the predetermined cumulative times, to be different for each super/sub-stoichiometric cycle.

The regeneration process works best if the catalyst has reached or is approaching a normal operating temperature. Therefore, there is little benefit if the air/fuel mixture is set to sub-stoichiometric while the engine is still warming up. Therefore, the timer may measure a third cumulative time from the time an engine starts to operate. The operation at a sub-stoichiometric level may then be overridden until the three-way catalyst has reached a temperature of at least about 500° C. Alternatively, it would be possible to use a temperature sensor in the catalyst, or at a suitable point in the exhaust stream. However, this would entail either the use of a nonstandard three-way catalyst, or the provision of a port or mounting point on an exhaust pipe, plus the wiring of a temperature sensor to an engine management system. This would add to the cost and complexity of the system, and it therefore preferred if the system waits and operates the engine at a super-stoichiometric level, if necessary, until a predetermined time sufficient for the catalyst to be expected to have reached a temperature of at least about 500° C.

Also according to the invention, there is provided a method of operating a motor vehicle exhaust catalytic converter, the engine comprising an engine management system with control means capable of controlling the engine air/fuel ratio alternately at a super-stoichiometric level and at a sub-stoichiometric level, a timer and memory means to store measured times, the converter comprising a three-way catalyst in-line with a motor vehicle exhaust conduit and having noble metals selected from the platinum group and rhodium, the catalyst exhibiting three-way oxidising activity on the exhaust gasses, characterised in that the method comprising the steps of:

i) using the control means to control the engine firstly at the super-stoichiometric level;

ii) using the timer and memory means to measure and store a first cumulative time during which the engine has been run at the super-stoichiometric level, during which time the efficiency of the three-way activity degrades;

iii) using the control means to switch the control of the engine to the sub-stoichiometric level once the first cumulative time has reached a predetermined cumulative time;

iv) using the timer and memory means to measure and store a second cumulative time during which the engine has been controlled at the sub-stoichiometric level; and v) using the control means to switch the control of the engine back to a super-stoichiometric level once the second cumulative time has reached another predetermined cumulative time;

in which the alternation between levels is such that the first cumulative time is greater than the second cumulative time, and the second cumulative time is between about one and ten hours to regenerate at least partially the efficiency of the three-way activity.

BRIEF DESCRIPTION OF THE DRAWINGS

The invention will now be further described by way of example, with reference to the accompanying drawing in which.

Figure 1:
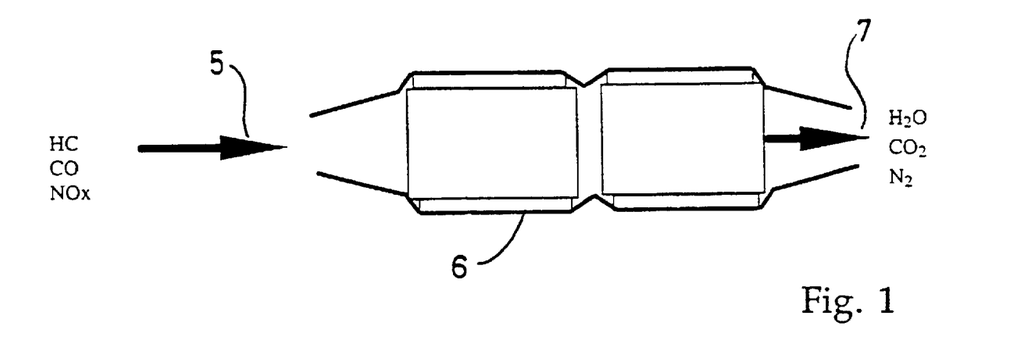
FIG. 1 is a schematic representation of the operation of a conventional three-way catalytic converter.

FIG. 1 shows schematically a conventional three-way catalyst 6 for a motor vehicle. A high proportion of noxious three categories of inlet gasses 5, HC, CO and NOx, are converted to safer outlet gases 7, $H_2O$, $CO_2$ and $N_2$. During operation of the catalyst, the so-called cross-over efficiency will gradually degrade from about 90% to about 60%–65% at an age equivalent to about 80,000 km. The cross-over efficiency is where the conversion efficiency of CO to $CO_2$ and NOx to $N_2$ is equal for a particular air/fuel ratio. The conversion efficiency for hydrocarbons HC does not drop as much, and is therefore not as great a concern.

The conversion efficiency is for each of the three categories of gasses is, of course, dependent on the converter operating temperature. A consequence of the drop in efficiency with catalytic converter age is that during warm up of the converter following engine start-up, the converter will need to reach a higher operating temperature before the efficiency for a particular class of gas reaches 50%. This temperature is referred to as a "T-50 light-off temperature", and can be used as a measure of catalyst efficiency. On one type of commercially available catalytic converter, the T-50 light off temperature increases from about 250° C. to 350° C. for HC, from about 245° C. to 350° C. for CO and from about 253° C. to 365° C. for NOx, as a catalytic converter ages from new to an age equivalent to about 80,000 km.

Figure 2:
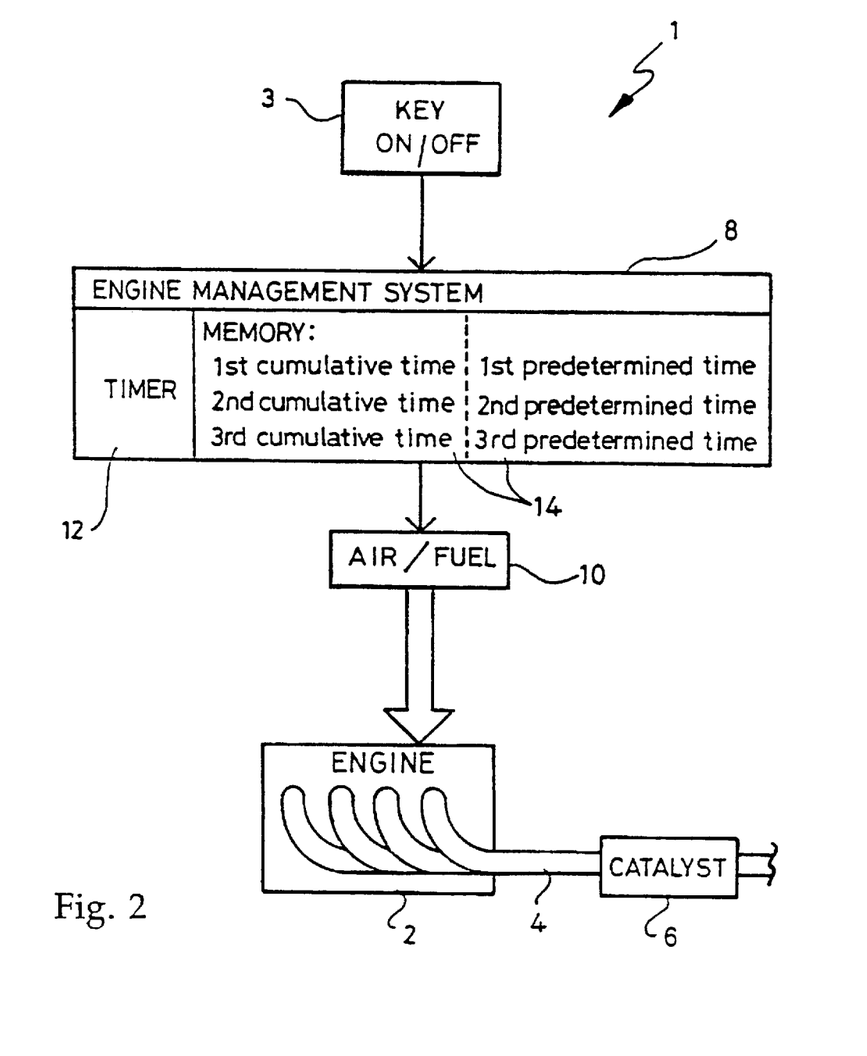
FIG. 2 is a schematic block diagram of an internal combustion engine having an internal combustion engine exhaust gas purification system according to the invention.

FIG. 2 shows in schematic block form an engine exhaust gas purification system 1 comprising an internal combustion engine 2, here a petrol 4-cylinder engine of 1.6 liter capacity, which may be turned on by a conventional key-operated switch 3. The engine 2 has an exhaust conduit 4 which leads to a conventional three-way catalyst 6 comprising noble metals selected from the platinum group and rhodium and having $9.2 \times 10^6$ cells units per square inch based on an alumina carrier.

The gas purification system also comprises an engine management system 8 which has control means 10 capable of controlling the engine air/fuel ratio alternately at a super-stoichiometric level and at a sub-stoichiometric level.

The engine management system 8 is based on a microprocessor chip, which has an on-board timer 12 and a non-volatile programmable memory 14.

The memory 14 stores first, second and third predetermined times, which are fixed for the lifetime of the system. The memory 14 also stores variable data of a first, second and third cumulative times, which are updated at intervals according to time intervals measured by the timer 12.

The first cumulative and predetermined times relate to time at super-stoichiometric operation; the second cumulative and predetermined times relate to time at sub-stoichiometric operation; and the third cumulative and predetermined times relate to time at super-stoichiometric operation before the engine 2 and catalyst 6 have had time to warm up fully.

Figure 3:
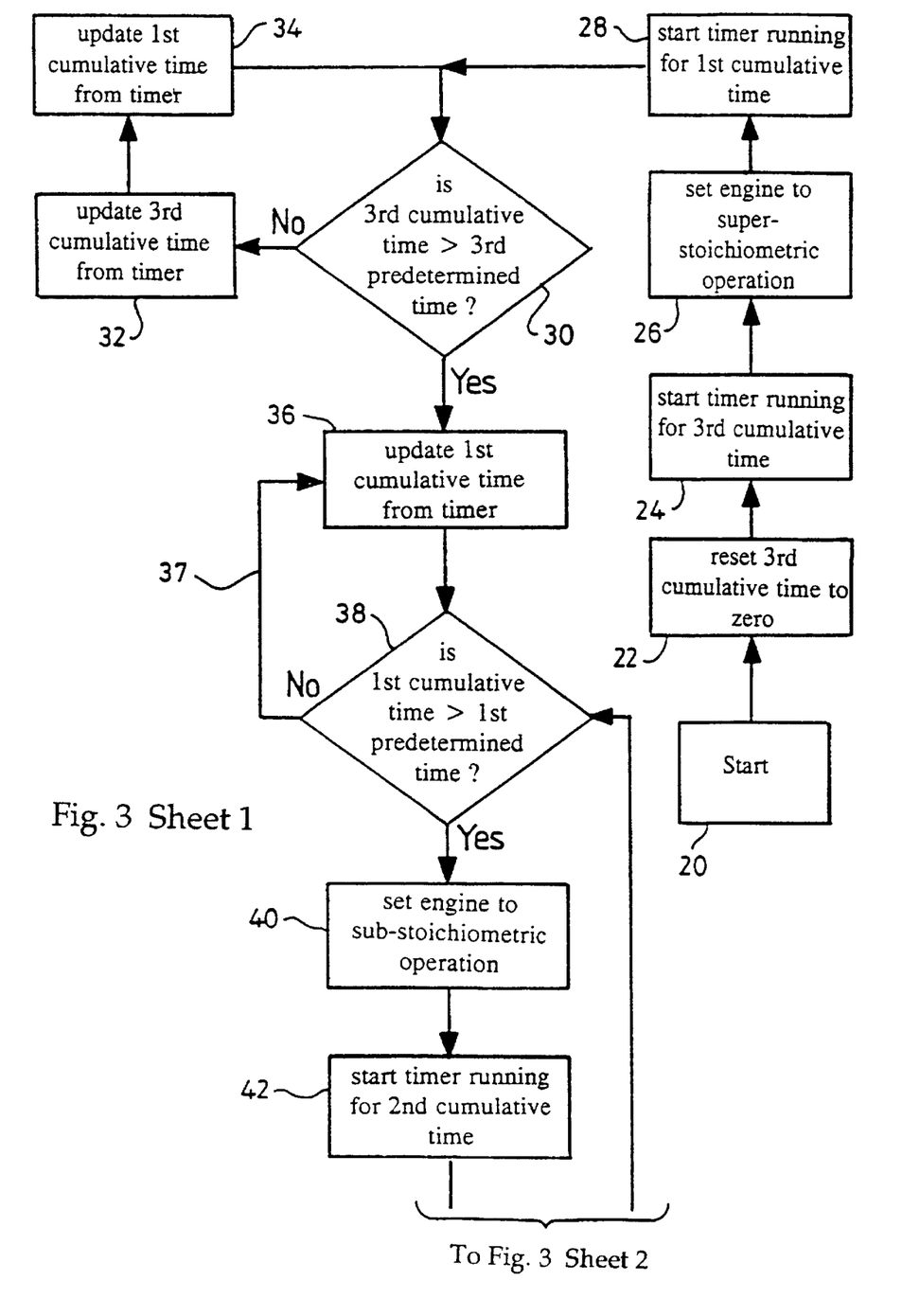
FIG. 3 is a flow chart describing the catalyst recovery operation of the exhaust gas purification system of FIG. 2.

Referring now also to FIG. 3, which is a simplified flow chart explaining the main steps of software running in the engine management system microprocessor, once the engine is started 20, several steps are taken: the third cumulative time in the memory 14 is set to zero 22; the timer 12 starts to time an interval for the third cumulative time 24; the engine is set by the control means 10 to super-stoichiometric operation 26; and, the timer 12 also starts to time an interval for the first cumulative time 28.

A test 30 is then made as to whether or not the third cumulative time is greater than the third predetermined time. On the first pass, the answer is 'no' and so the third cumulative time is updated 32 from the timer 12. The update consists of a time interval from the last update or reset which is added to the third cumulative time.

Because the initial operation of the engine 2 is at a super-stoichiometric level, the first cumulative time is similarly updated 34, but in this case the interval will, in general, be added to a non-zero first cumulative time value.

The third cumulative time test 30 is repeated in the above-described loop 30,32,34 until the test indicates that the third cumulative time exceeds the third predetermined time. The first cumulative time is then updated 36, and a test 38 is made as to whether or not the first cumulative time exceeds the first predetermined time. If not, the software loops back 37 to update the first cumulative time 36. If so, then the catalyst is deemed to have aged a sufficient amount for it to be worthwhile to enter a partial regeneration phase of relatively rich air/fuel mixture. The following steps then occur: the engine is set to sub-stoichiometric operation 40; the timer 12 starts to time an interval for the second cumulative time 42 which may be zero or some other value; and the second cumulative time is then updated 44 in a similar manner as described above for the other time intervals.

A test 46 is then made to determine whether or not the second cumulative time is greater than the second predetermined time. If not, the software loops back 47 to update the second cumulative time 44. If so, then the catalyst is deemed to have been sufficiently regenerated for the engine operation to be reset to a normal phase of relatively lean air/fuel mixture.

The first cumulative time is then reset 48 with the difference (first cumulative time)-(first predetermined time). This value will only be zero or close to zero if the engine has been run continuously from the start of the regeneration phase until the second predetermined time. If the engine has been started and stopped at short intervals, for example being left on for only 15 minutes at a time, then the engine will have spent a significant amount of time at super-stoichiometric operation prior to the engine warming up. This excess time at super-stoichiometric operation is therefore carried forward.

The second cumulative time is then rest to zero 50, the engine operation reset to normal super-stoichiometric operation 52, and the timer 12 started to time an interval for the first cumulative time 54.

The software then loops back 55 to the point at which the first cumulative time is tested against the first predetermined time 38.

In a preferred embodiment of the invention: the first predetermined time is between 100 to 300 hours, equivalent roughly to 5,000 km to 30,000 km of normal ageing, the second predetermined time is between one and 10 hours, equivalent roughly to 50 km to 1,000 km of normal ageing; and the third predetermined time is between five and 15 minutes.

In normal use therefore, the alternation between sub- and super-stoichiometric levels is such that the first cumulative time is greater than the second cumulative time.

The following examples use data obtained from an engine test cell apparatus and illustrate the regeneration effect described above.

EXAMPLE 1

A fresh conventional three-way catalyst comprising platinum, palladium and rhodium with $9.2 \times 10^6$ cells units per square inch based on an alumina carrier was placed in the exhaust stream of a four-cylinder injection motor. The inlet temperature of the exhaust was 720° C. and the air/fuel lambda was 1.01. The catalyst was aged under accelerated ageing conditions for about 400 hours to a level at which the catalyst efficiency was consistent with a nominal 80,500 km (50,000 miles) of normal use. The CO/NOx cross-over efficiency was measured to be about 61% at a lambda of 0.995.

The catalyst was then subjected to 60 hours at a relatively rich operation at a lambda of 0.8 and with an inlet gas temperature of 850° C., corresponding to an internal catalyst temperature of 930° C. Data showing the regeneration of the catalytic converter over this 60 hour period is shown in FIGS. 4 to 7.

Figure 4:
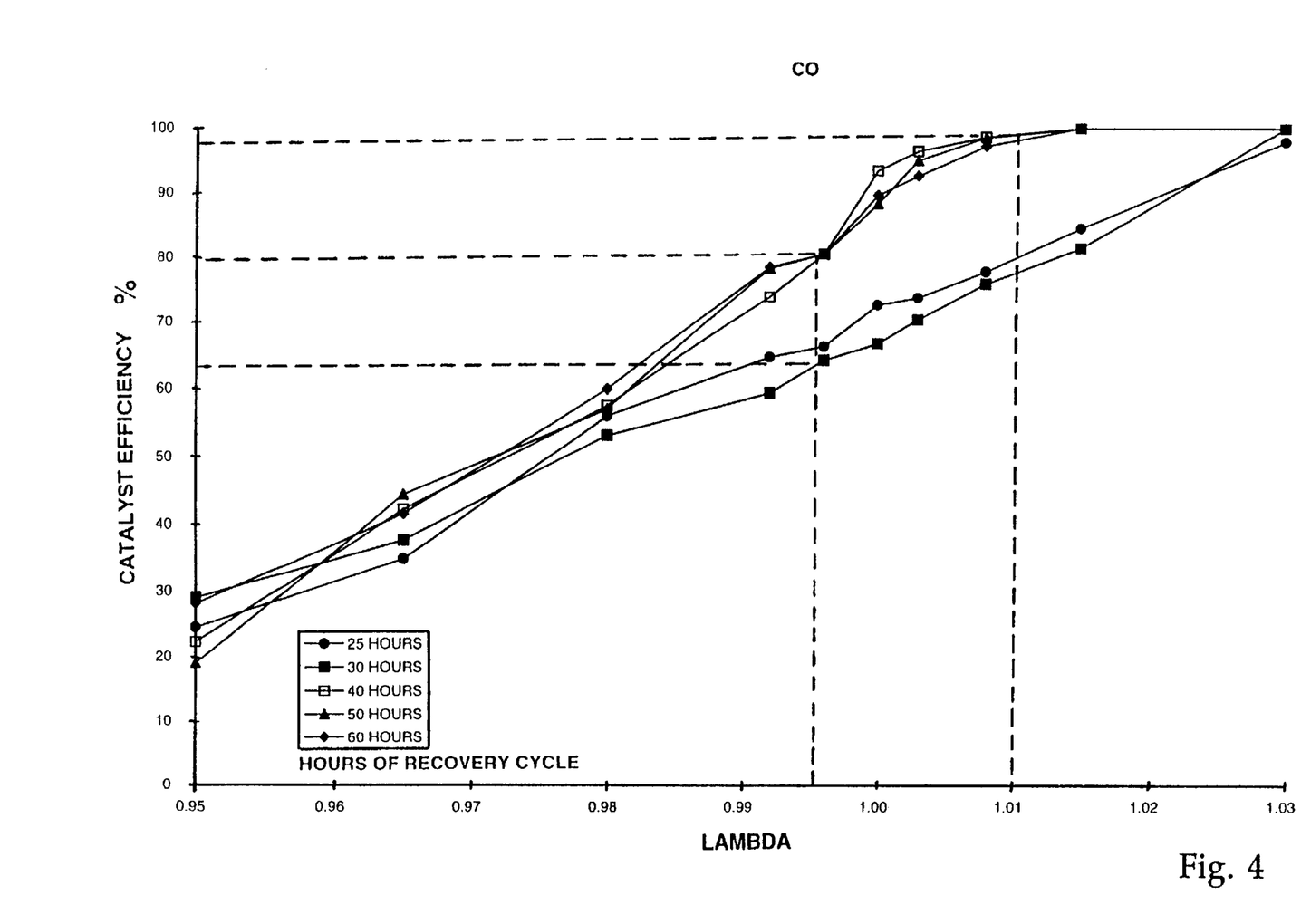
FIG. 4 is a plot for a catalytic converter aged to an equivalent 80,500 (50,000 mile) level, of CO catalyst efficiency for against air fuel mixture lambda for various lengths of catalyst recovery time.

In FIG. 4, the CO catalyst efficiency at a lambda of 1.01 can be seen to have been restored by over 20% to about 98%, with most of the increase having occurred between 30 and 40 hours of sub-stoichiometric, or rich operation.

Figure 5:
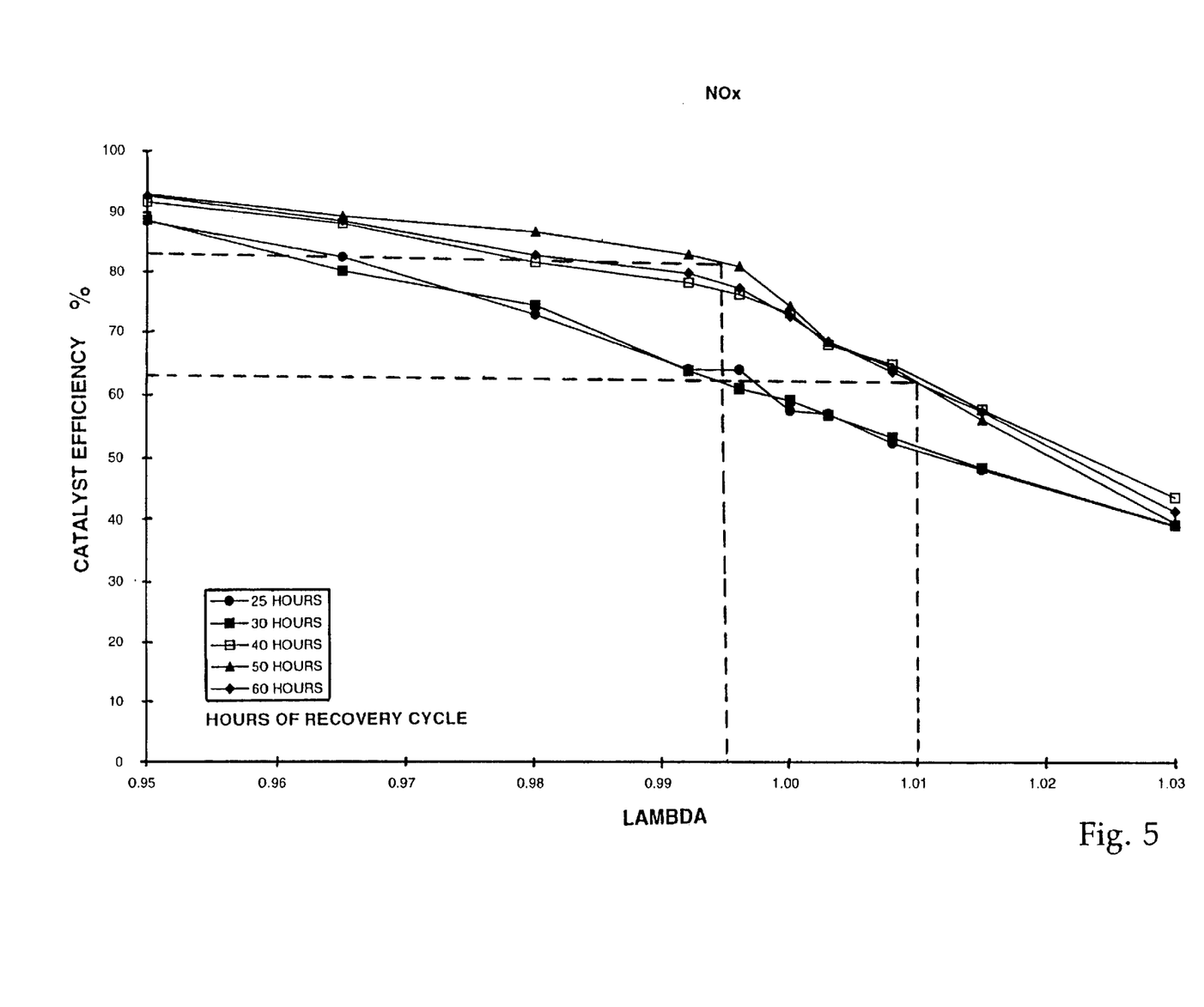
FIG. 5 is a plot for a catalytic converter aged to an equivalent 80,500 km (50,000 mile) level, of NOx catalyst efficiency for against air fuel mixture lambda for various lengths of catalyst recovery time.

In FIG. 5, the NOx catalyst efficiency at a lambda of 1.01 can be seen to have been restored by over 10% to about 63%, again with most of the increase having occurred between 30 and 40 hours of rich operation.

Figure 6:
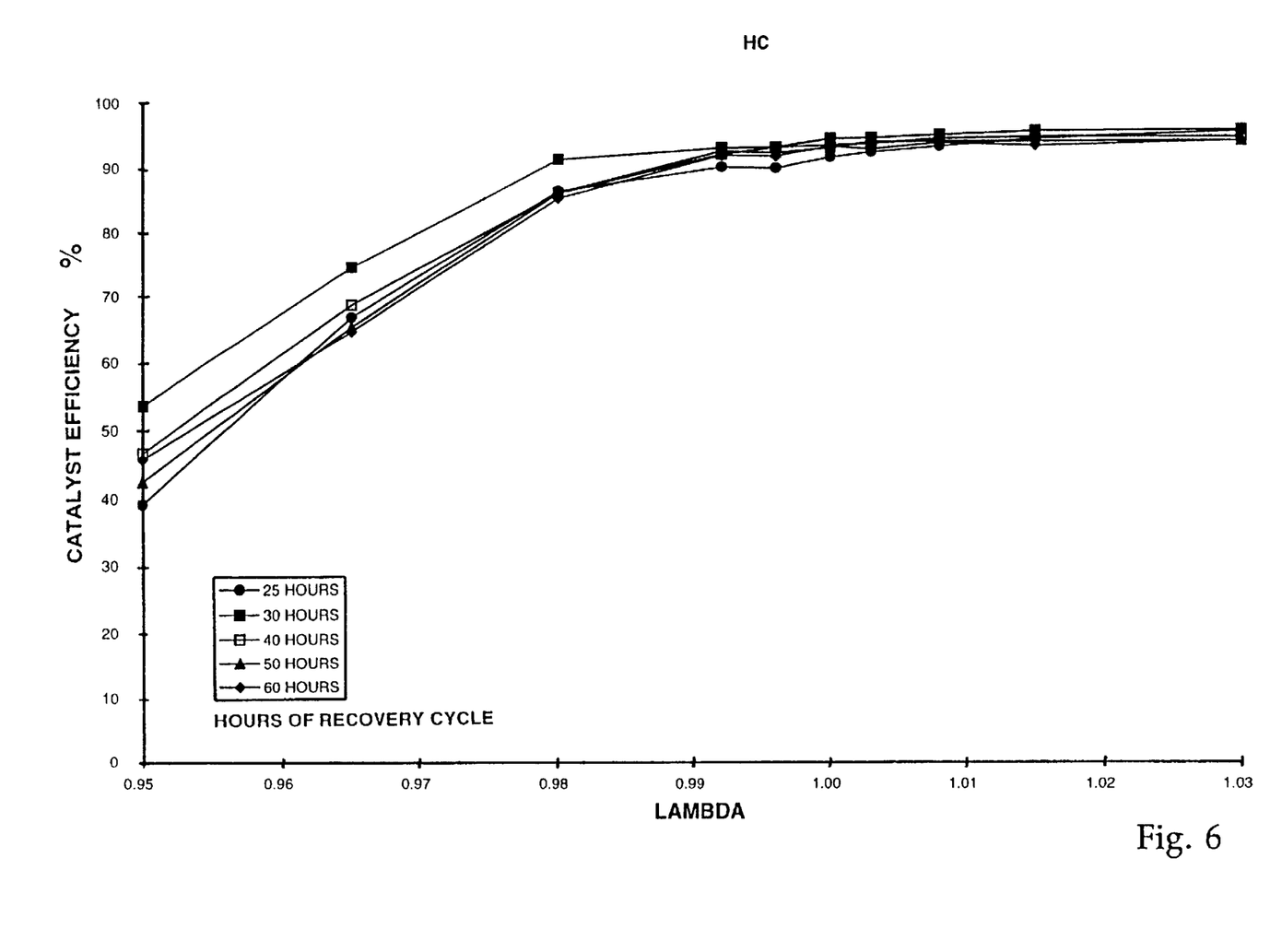
FIG. 6 is a plot for a catalytic converter aged to an equivalent 80,500 km (50,000 mile) level, of HC catalyst efficiency for against air fuel mixture lambda for various lengths of catalyst recovery time.
Figure 7:
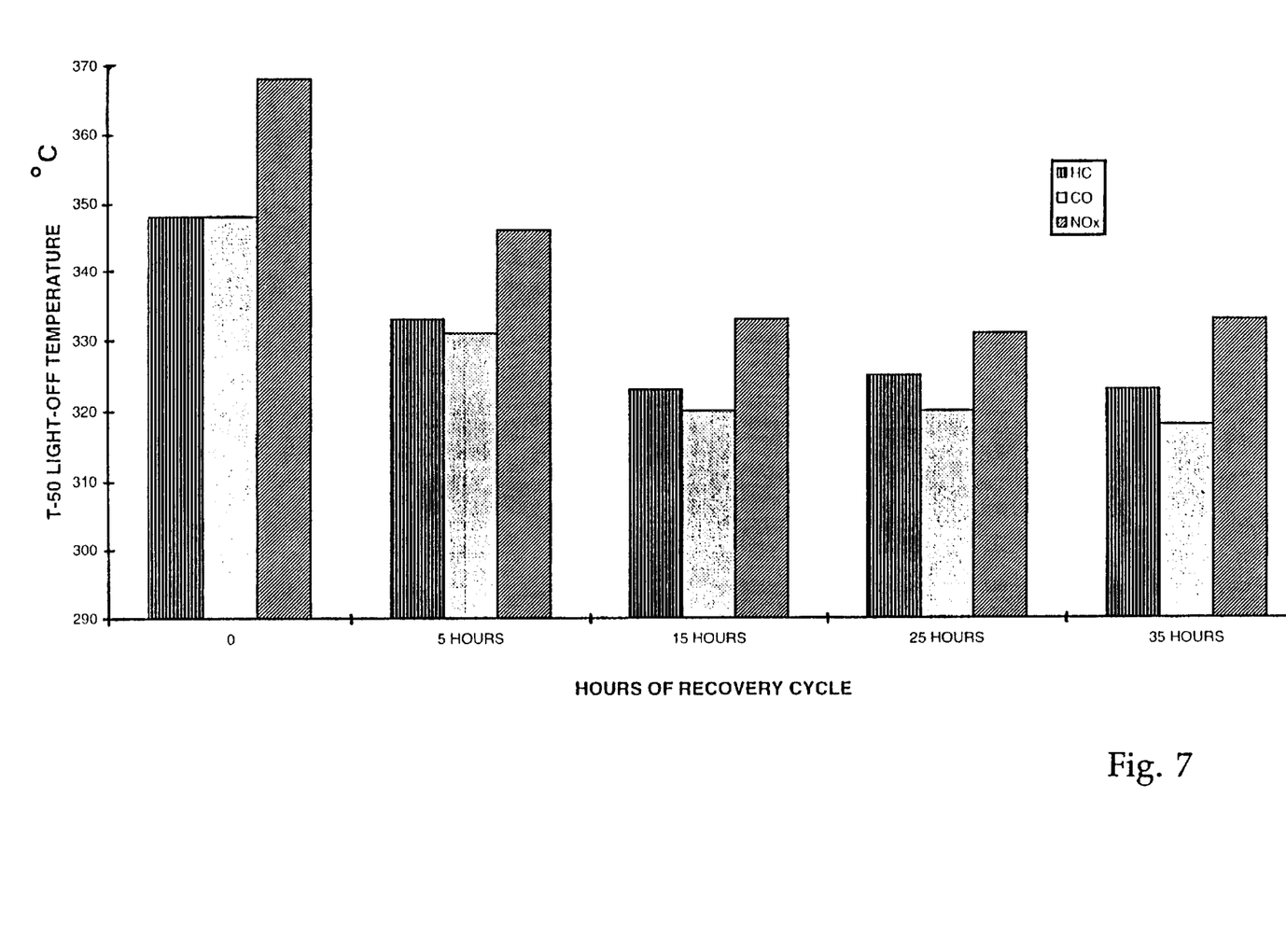
FIG. 7 is a plot for a catalytic converter aged to an equivalent 80,500 km (50,000 mile) level, of T-50 light-off temperature against various lengths of catalyst recovery times, for CO, NOx and HC.

FIG. 6 shows that the HC catalyst efficiency is essentially unchanged by the recovery process, but this is because the HC catalyst efficiency has not degraded appreciably by to 80,500 km (50,000 mile) level.

In FIGS. 4 and 5, a vertical dashed line is drawn at a lambda of 0.995, corresponding to the approximate lambda at which the CO and NOx curves would cross over, if plotted on the same chart. From this it can be seen that, within the experimental error suggested by irregularities of the data points, the cross-over efficiency is improved by about 20% to above 80%.

EXAMPLE 2

The same catalytic converter was then aged under similar conditions again to a level consistent with a further 80,500 km (50,000 miles) of usage, and then subjected to the same 60 hours of regeneration. In this instance, the catalyst cross-over efficiency was regenerated from about 58% to 75%, measured at a lambda of 0.995.

EXAMPLE 3

A similar fresh catalytic converter was then aged under similar conditions again to a level consistent with a further 80,500 km (50,000 miles) of usage.

Figure 8:
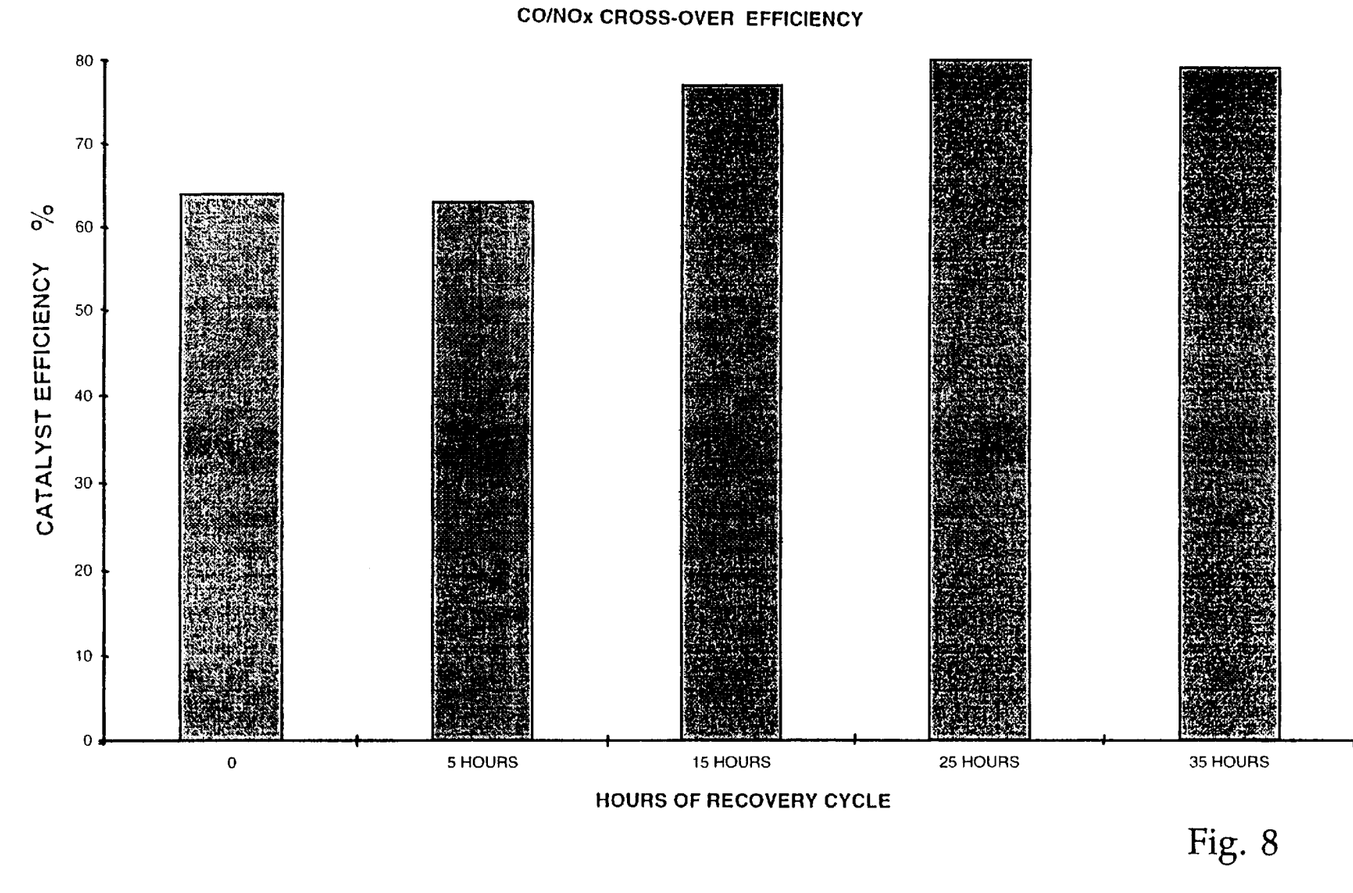
FIG. 8 is a plot for a catalytic converter aged to an equivalent 80,500 km (50,000 mile) level, of CO/NOx cross-over efficiency against catalyst recovery time.

The catalyst was then regenerated for 35 hours at a relatively rich operation at a lambda of 0.8 as described above, following which the $CO/NO_x$ cross-over efficiency was measured to have been restored to 80%, as is shown in FIG. 8. In this case, most of the improvement occurred between five and 15 hours. It is thought that the quantitative differences between this example and the data of Example 1 is due to variability in the accelerated ageing process, and differences between converters.

EXAMPLE 4

A similar fresh catalytic converter was aged under similar conditions to that described in Example 1. In this case, the catalyst was aged under accelerated ageing conditions for 75 hours to a level consistent with a nominal 10,000 km, at which point the $CO/NO_x$ cross-over efficiency was measured to be 82%.

The catalyst was then regenerated for 10 hours at a relatively rich operation at a lambda of 0.8 as described above, following which the $CO/NO_x$ cross-over efficiency was measured to have been restored to 85% of the fresh catalyst efficiency, measured at a lambda of 0.995.

Although there is an irretrievable loss of efficiency due to thermal fusion of the alumina carrier at the operating temperature, and consequent loss of active surface area, the above examples show that it is possible to significantly regenerate the catalyst efficiency, with a relatively short time of relatively rich operation. The decreased overall three-way efficiency of the catalyst, and loss of fuel economy during this regeneration phase, is more than offset by the regeneration of the catalyst efficiency to a level, initially consistent with a lifetime equivalent to about 8,500 km (5,000 miles)

The regeneration strategy may be employed more than once, and although the gains are not as great on subsequent cycles, it is still possible to improve the catalyst efficiency significantly.

Because the exhaust gas purification system according to the invention does not require any modification to a standard three-way catalyst, or the introduction of temperature measurement apparatus into the exhaust stream, the invention may readily be implemented on a wide range of existing exhaust systems having engines with engine management systems able to control the air/fuel ratio.

What is claimed is:

1. An exhaust gas purification system (1) for an internal combustion engine, comprising:

an internal combustion engine (2) having an exhaust conduit (4);

an engine management system (8) with control means for controlling the engine (2) air/fuel ratio (10) alternately at a super-stoichiometric level and at a sub-stoichiometric level;

a three-way catalyst (6) in-line with the exhaust conduit (4) and comprising noble metals selected from the platinum group and rhodium, the catalyst (6) exhibiting a three-way oxidizing activity on the exhaust gases; and the efficiency of the three-way activity degrading over time when the engine (2) is operated at a super-stoichiometric level with the engine management system (8) comprising timer (12) and memory (14) to measure and store more than one cumulative time, including a first cumulative time over which the control means controls the engine (2) at the super-stoichiometric level and during which the efficiency of the three-way activity degrades, and also a second cumulative time over which the control means controls the engine (2) at a sub-stoichiometric level, the alternation between levels being such that the first cumulative time is greater than the second cumulative time, and the second cumulative time is between about one and ten hours to regenerate at least partially the efficiency of the three-way activity with timer (12) measuring a third cumulative time from the time engine (2) starts to operate, with the operation at a sub-stoichiometric level being overridden if necessary so that engine (2) operates at a super-stoichiometric level until a predetermined time sufficient for catalyst (6) to have reached a temperature of at least about 500° C.

2. An exhaust gas purification system (1) as claimed in claim 1, in which the alternation between levels is such that the first cumulative time is at least ten times the second cumulative time.

3. An exhaust gas purification system (1) as claimed in claim 1, in which the predetermined cumulative time for super-stoichiometric operation is at least one hour.

4. An exhaust gas purification system (1) as claimed in claim 1, in which the predetermined cumulative time for super-stoichiometric operation is no more than 1,000 hours.

* * * * *